US005536546A

United States Patent [19]

Nash

[11] Patent Number: 5,536,546

[45] Date of Patent: Jul. 16, 1996

[54] LINERLESS LABELS WITH EXTENDED CUTS IN CROSS-PERFORATIONS

[75] Inventor: Thomas P. Nash, Getzville, N.Y.

[73] Assignee: Moore Business Forms, Inc., Grand Island, N.Y.

[21] Appl. No.: 435,228

[22] Filed: May 5, 1995

[51] Int. Cl.[6] ........................ B32B 3/10

[52] U.S. Cl. ........................ 428/43; 428/136; 156/252; 156/253

[58] Field of Search ........................ 428/43, 131, 136; 206/390; 156/252, 253

[56] References Cited

U.S. PATENT DOCUMENTS

| | | | |
|---|---|---|---|
| 4,745,835 | 5/1988 | Schnitzer | 83/678 |
| 5,114,771 | 5/1992 | Ogg et al. | 428/43 |
| 5,354,588 | 10/1994 | Mitchell et al. | 428/40 |

*Primary Examiner*—Alexander S. Thomas
*Attorney, Agent, or Firm*—Nixon & Vanderhye

[57] ABSTRACT

Linerless labels are constructed in such a way that when they are manually dispensed they do not tear, but rather rip (separate cleanly) along predefined perforation lines. This is accomplished by providing those cuts of the perforation lines that intersect the slits or side edges of a composite web of linerless labels (and thus the side edges of individual labels when dispensed) have a length great enough to facilitate the start or end of ripping action. The length of each of these end-edge/slit intersecting cuts is at least twice (preferably at least four times) as great as the normal cuts of the alternating cuts and ties forming a perforation line, typically having a length of between about 0.125–0.25 inches (and spaced from each other between about 0.5–1.0 inches), when each of the standard cuts has a length of about 0.012–0.018 inches.

20 Claims, 2 Drawing Sheets

LINERLESS LABELS WITH EXTENDED CUTS IN CROSS-PERFORATIONS

BACKGROUND AND SUMMARY OF THE INVENTION

Linerless labels have become increasingly popular as a widely used type of business form. Linerless labels may be either automatically or manually dispensed, but when manually dispensed typically include perforation lines about which the labels are ripped from a web to individually dispense the labels. In co-pending application Ser. No. 08/321,025 filed Oct. 6, 1994 (the disclosure of which is hereby incorporated by reference herein), for the first time the details of the perforation line separating; one label from another were studied to ensure that they were not too weak or too strong. One of the problems recognized in that application was that there can be a problem with tearing of the labels—rather than ripping along the perforation lines—and one proposed solution to that problem was to provide V or U shaped cutouts at the ends of the perforation lines, as well as by properly providing particular cut-to-tie ratios, percentages of hold, and the like. While this procedure can be successful, it is difficult to implement when forming composite webs of labels where a plurality of labels are produced side by side (in the direction of web movement) and where slitters are typically utilized to slit the web into individual label webs.

When conventional label webs are slit into individual label webs, sometimes the slits intersect a cut in a perforation line, and sometimes they intersect a tie. When they intersect a cut severing of each individual label from another label in an individual label web is facilitated somewhat, however if the cut is not long enough the label may still tear (that is separate aside from along the perforation line) rather than ripping (separating cleanly) along the perforation line. This can lead to significant frustration in manually dispensing linerless labels.

According to the present invention a composite web of linerless labels, and a method of production thereof, are provided which overcome the drawbacks associated with the production of conventional linerless labels, in such a way that tearing of the labels when manually dispensed is essentially eliminated, the labels typically—even with a modicum of care—ripping along the perforation lines. It is preferred that the label webs and method according to the present invention follow the teachings of the co-pending application Ser. No. 08/321,025 as far as the cut-to-tie ratios, cuts per inch, and variations thereof depending upon whether permanent or repositional adhesive is utilized, although the invention may be practiced with other or conventional perforation configurations, dimensions and procedures. These results are accomplished, according to the present invention, by basically providing cuts of different length, including particularly long cuts which are intersected by the slits forming the label web into individual label webs, and also typically at the side edges of the web. In this way it is ensured that cuts intersect the side edges of the individual label webs and the cuts are dimensioned so as to facilitate ripping along the perforation lines rather than tearing of the labels.

According to one aspect of the present invention a composite web of linerless labels is provided comprising the following components: A paper substrate having a pressure sensitive adhesive layer on a first face thereof, a release coating on a second face thereof, a dimension of elongation, and at least one slit substantially parallel to the dimension of elongation. A plurality of substantially so parallel perforation lines formed in the web generally perpendicular to the dimension of elongation and with the at least one slit defining the web into individual labels. And, each perforation line comprising alternating cuts and ties, the cuts comprising a plurality of first cuts having a first length, and at least one second cut having a second length at least twice as great as the first length and facilitating the start or end of ripping action of the web, without tearing of the web, along the perforation line, the at least one second cut intersecting the at least one slit, part of the second cut on each opposite side of the slit.

The at least one slit typically comprises a plurality of slits, each slit substantially bisected by one of the second cuts. The second cuts typically have a length that is at least four times as great as a first cut; for example, each second cut may have a length of between about 0.125–0.25 inches, while each first cut has a length of about 0.012–0.018 inches. As provided in co-pending application Ser. No. 08/321,025, 30–58 first cuts may be provided per inch, each with a thickness of about 0.025–0.030 inches. The web may also include first and second side edges substantially parallel to the dimension of elongation and the at least one slit, and a second cut of each perforation lines intersects each of the first and second side edges also. Depending upon how the equipment to effect production is set up, it may be desirable to in some cases provide second (longer) cuts even at intermediate positions along each perforation line of each label (that is an intermediate second cut is provided between the slits and side edges, for example a second cut being provided every 0.5–1.0 inches along the perforation line).

According to another aspect of the present invention a method of producing linerless labels using a paper web having first and second faces is provided. The method typically comprises the so following steps: (a) Feeding the web in a first direction. (b) Perforating the web at regularly spaced locations along the web in the first direction to form perforation lines, each perforation line extending substantially perpendicular to the first direction and comprising alternating cuts and ties, the cults comprising a plurality of first cuts having a first length, and at least one second cut having a second length at least twice as great as the first length and facilitating the start or end of ripping action of the web, without tearing of the web, along the perforation line. (c) Applying a release coating to the first face of the web. (d) Applying a pressure sensitive adhesive layer to the second face of the web. And, (e) forming at least one slit in the web, substantially parallel to the first direction, so that each of the at least one slits intersects a second cut of each perforation line, part of the second cut on each opposite side of the slit.

Steps (b) through (e) may be practiced sequentially, or in a different sequence; there may also be the further step (a1) of printing indicia on the web first face, in which case steps (a1)–(e) may be practiced sequentially. Steps (b) and (e) are typically practiced to form a plurality of slits, each of the plurality of slits intersecting a second cut of each perforation line, and step (b) is preferably practiced so that each second cut has a length at least four times greater than that of a first cut. The web may have first and second side edges substantially parallel to the first direction and the slits, in which case step (b) is further practiced to provide second cuts intersecting the first and second side edges of the web. The cut lengths, number of cuts per inch, and cut widths may be as discussed above with respect to the web of linerless labels.

It is the primary object of the present invention to provide a web of linerless labels, and method of production thereof, which facilitate manual dispensing of the linerless labels so that instead of tearing during dispensing the labels will uniformly rip (separate cleanly) along the perforation lines. This and other objects of the invention will become clear from an inspection of the detailed description of the invention and from the appended claims.

DETAILED DESCRIPTION OF THE DRAWINGS

Figure 1:
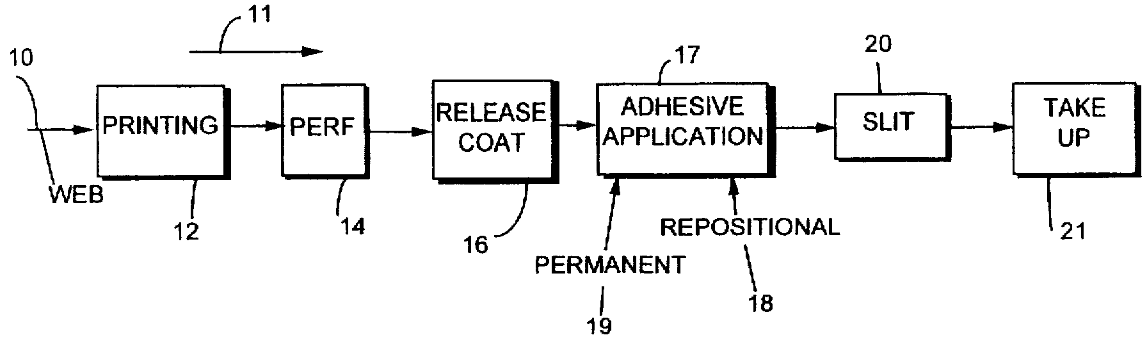
FIG. 1 is a block diagram schematically illustrating various method steps that may be practiced in the method of producing linerless labels according to the present invention.

FIG. 1 schematically illustrates the production of linerless labels according to the method of the present invention, having optimized perforations and slits therein. A web of paper 10 is fed in a first direction 11 and is optionally acted upon at print stage 12.

With respect to the particular embodiment in FIG. 1, in the printing stage 12 indicia is applied, by any suitable impact or non-impact printing technique, to the first face of the web 10. Particular indicia is illustrated at 15 in FIGS. 2 and 5, and may be variable, non-variable, or both. Also while printing typically is always on the first face of the web 10, it also may be applied to the second face too.

Typically after the printing stage 12 the web is perfed, adhesive is applied, and a release coating is applied. While these stages are illustrated in a particular sequence in FIG. 1, it is to be understood that all stages illustrated in FIG. 1 may be in different sequences depending upon the particular situation involved. For permanent adhesive linerless labels the procedure may be print, perf, release coat, adhesive coat, slit, and take-up. For repositional adhesive the procedure may be print, release coat, adhesive coat, perf, slit, and take-up.

At perf stage 14 perforation lines are formed in the web 10. The perforation lines typically are perpendicular to the direction of movement 11 and are formed by applying a perforation pressure of about 500–600 lbs. per inch (typically about 550 lbs. per inch) to a perforating blade. An exemplary prior art perforating blade is shown schematically in FIG. 4 of copending application Ser. No. 08/321,025. Alternatively properly dimensioned label dies may be used.

In the perf stage 14 perforation lines are formed in which each perforation line comprises alternating cuts and ties. If the preferred embodiment of Ser. No. 08/321,025 is followed, there is a cut to tie ratio of about 0.018×0.008 to 0.012×0.008, and between this minimum and maximum respectively the standard cut to tie ratio is 0.016×0.008. This cut to tie ratio is utilized for both permanent and repositional adhesive labels. Also in the perforating stage 12, 30–58 cuts are typically provided per inch, the number of cuts per inch and other variables depending upon whether permanent or repositional adhesive is utilized.

In the FIG. 1 embodiment the next treatment stage is stage 16 in which the release coat is provided to the first face of the web. The release coat is applied by conventional techniques, and typically is a silicone based release material which will not adhere to the adhesive applied at stage 17.

The next stage illustrated in FIG. 1 is the adhesive application stage 17, in which pressure sensitive adhesive is typically applied to the second face of the web 10 utilizing conventional equipment. The adhesive applied may be permanent adhesive, as illustrated schematically at 19 in FIG. 1, or repositional adhesive as indicated schematically at 18, or other types of pressure sensitive adhesive. Any suitable conventional label permanent or repositional (e.g. CLEAN-TAC® adhesive from Moore Business Forms, Inc.) may be utilized.

After steps 12, 14, 16, and 17 of FIG. 1—regardless of the order—the completed composite web is typically slit—as illustrated at 20—to form the composite web into individual webs, and then the individual webs are taken up individually (or collectively), as indicated schematically by box 21 in FIG. 1. Normally the webs are taken up in a roll form, the adhesive face of one overlying portion of the web engaging the release face of an underlying label on the roll.

FIG. 1 illustrates the most basic construction according to so the present invention. A wide variety of other types of coatings may also be applied, however, and are within the scope of the present invention. For example various tie coats may be provided for causing the adhesive or the release coat to better adhere to the web 10. Also thermal imaging coats may be provided if the label is to be used with a thermal printhead, or the web 10 may have preapplied thermal coats. Exemplary linerless labels that are conventionally made and which are suitable for manufacture according to the present invention (having a particular perting stage 14 and slitting stage 20 thereof) are shown in U.S. Pat. No. 5,354,588 and U.S. Pat. No. 5,292,713, the disclosures of which are hereby incorporated by reference herein.

Figure 2:
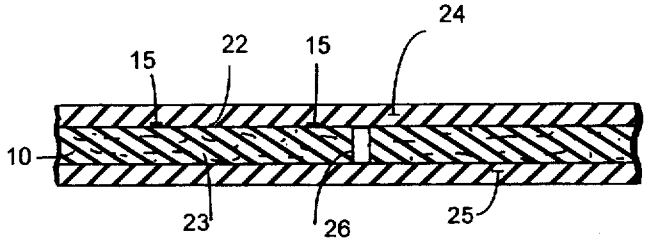
FIG. 2 is a side cross-sectional view, greatly enlarged for clarity of illustration, of a portion of an exemplary linerless label web according to the present invention.

FIG. 2 illustrates schematically a simplified form of an exemplary web of linerless labels according to the present invention comprising a paper substrate or web 10 having a first face 22 and a second face 23. The first face 22 has the indicia 15 thereon, and additionally the coating 24 of release material. The second face 23 has the pressure sensitive adhesive coating 25 thereon, either permanent adhesive or repositional adhesive. A cut 26 of a perforation line 27 (see FIG. 3) is also illustrated in FIG. 2, while FIG. 3 also illustrates the ties 29 between the cuts 26. The cuts 26 typically have a thickness of about 0.025–0.030 inches, with an optimum of about 0.028 inches.

Figure 3:
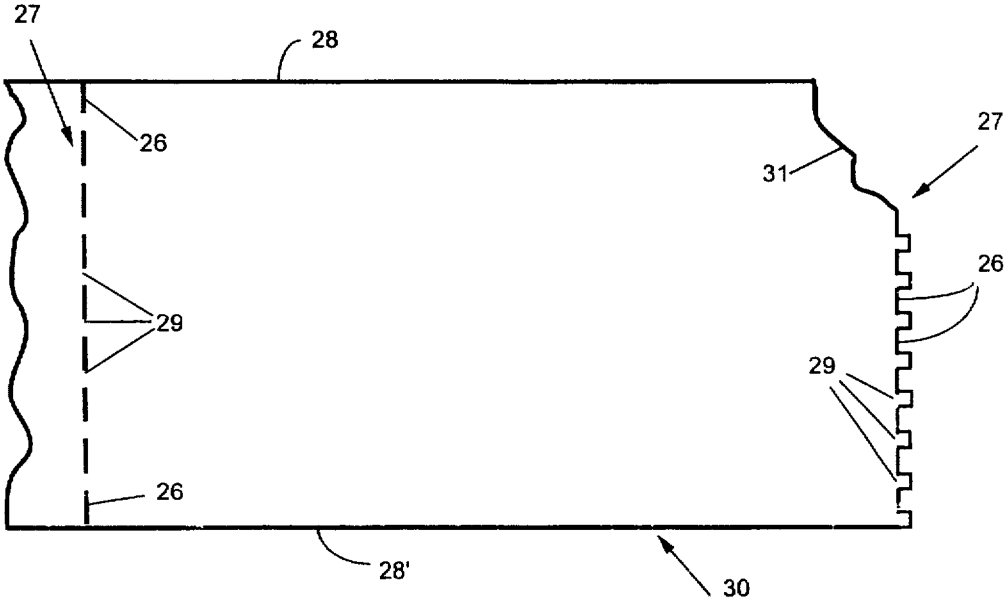
FIG. 3 PRIOR ART
FIG. 3 is a top plan view of a portion of a prior art web of linerless labels, illustrating tearing rather than ripping (clean separation) along a perforation line.

FIG. 3 schematically illustrates an exemplary prior art individual linerless label web such as produced according to the method of FIG. 1, but without the modifications of the perforation stage 14 and slitting stage 20 according to the invention. An individual label is shown generally by reference numeral 30 and has side edges 28, 28' with ties 29 between the cuts 26. The edges 28, 28' are typically formed by slitting of a composite web (10). Note that the slits (edges) 28, 28' may or may not intersect a cut 26. For example in FIG. 3 at the top a cut is intersected, while at the bottom no cut is intersected. When dispensing the label 30, which is typically done manually, the label may easily tear—as indicated at 31 in FIG. 1—rather than ripping (separating cleanly) along perforation line 27.

Figure 4:
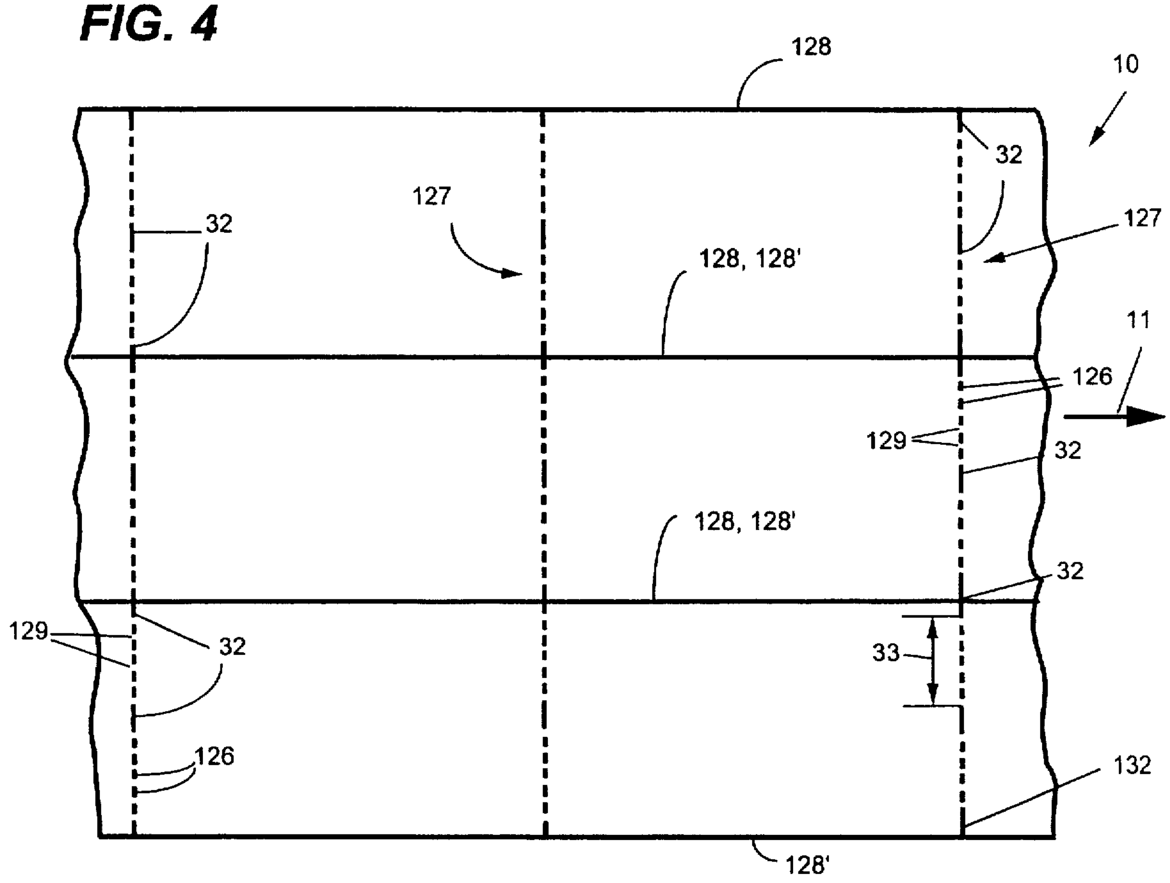
FIG. 4 is a top plan view of a portion of a composite web of linerless labels according to the present invention which his three labels wide, shown after slitting and prior to take-up.
Figure 5:
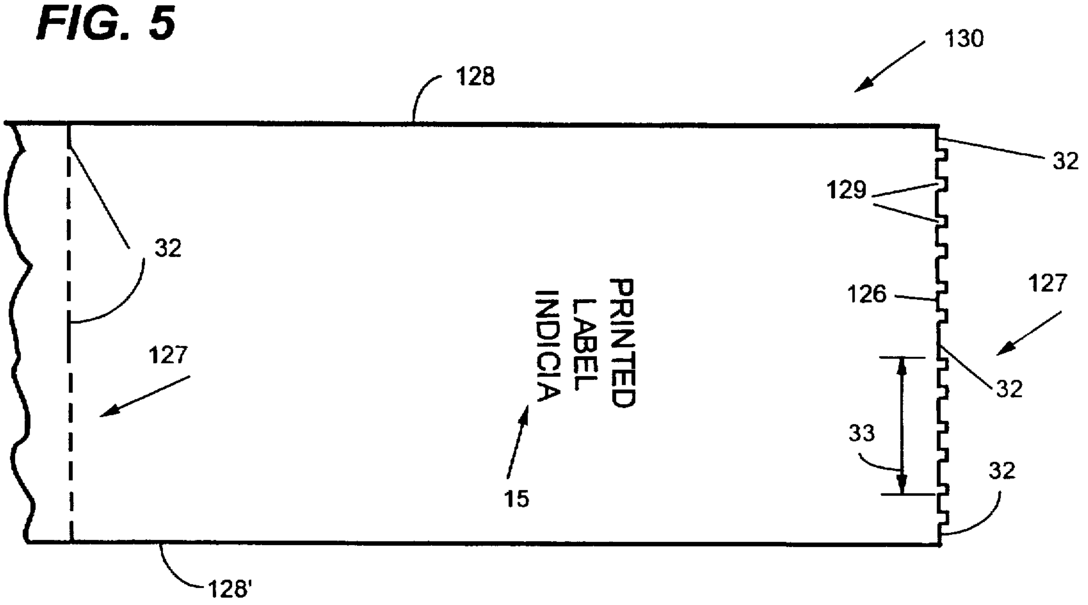
FIG. 5 is a top plan view of a portion of one of the individual label webs from the composite web of FIG. 4.

According to the present invention the tearing problem schematically illustrated in FIG. 3 is avoided. FIGS. 4 and 5 show a composite web, and individual web, respectively, according to the present invention. In FIGS. 4 and 5 components comparable to those shown in FIG. 3 are shown by the same reference numeral only preceded by a "1". While the composite web 10 is shown in FIG. 4 as three labels (130) wide, it is to be understood that also any number of labels in width may be provided (e.g. 2–20), with or without marginal (non-used) portions at the edges.

FIG. 4 illustrates a complete composite web 10 after slitting, but before separation along the slit lines for take-up. The edges or slit lines are illustrated by reference numerals 128, 128' and are substantially parallel to the direction of movement 11, and the individual perforation lines 127 include first cuts 126 separated by ties 129. According to the present invention second cuts 32 are provided, which are longer than the first cuts 126. The second cuts 32 are preferably at least twice as long as the first cuts 126, and most preferably at least four times as long. In the preferred embodiment according to the invention, the second cuts 32 range in size between about 0.125 inch–0.25 inch (although typically of the same size within any particular composite web 10, although the lengths of cuts 32 may be varied for special circumstances within a composite web 10). Typically, so as to facilitate the manufacturing process, the second cuts 32 are spaced from each other a regular fixed distance 33 which is preferably between about 0.5–1.0 inches (e.g. 0.75 inches). Spaced in this manner it is possible to easily adjust the production equipment to accommodate individual labels 130 of different widths (the dimension perpendicular to the direction 11) while still allowing practice of the invention. This means under many circumstances one or more intermediate second cuts 32 will be provided between the side edges/slits 128, 128' of a particular individual label 130 (as seen in FIG. 5, for example).

According to the present invention not only are the second cuts 32 provided, but the slits (and side edges) 128, 128' substantially bisect the cuts 32 so that at least a portion (and preferably about half) is on either side thereof.

By practicing the present invention the label 130 (see FIG. 5) according to the present invention, when dispensed, will cleanly separate (rip) along the perforation lines 127 because at either edge 128, 128' thereof will be an elongated cut 32, the cut 32 being at least about 1/16th of an inch long (perpendicular to a side edge 128, 128'), compared to the lengths of the first cuts 126, which are typically only between about 0.012–0.018 inches.

The cuts 32 may be formed merely by providing elongated teeth of an otherwise conventional perforating blade used to produce the labels at various positions along the length thereof (such as shown per se, although not with the appropriate dimensions and not for linerless labels, in U.S. Pat. No. 4,745,835), or by providing modified conventional label dies.

It will thus be seen that according to the present invention an advantageous web of linerless labels and method of producing linerless labels are provided. While the invention has been herein shown and described in what is presently conceived to be the most practical and preferred embodiment thereof it will be apparent to those of ordinary skill in the art that many modifications may be made thereof within the scope of the invention, which scope is to be accorded the broadest interpretation of the appended claims so as to encompass all equivalent structures and methods.

What is claimed is:

1. A composite web of linerless labels comprising:

a paper substrate having a pressure sensitive adhesive layer on a first face thereof, a release coating on a second face thereof, a dimension of elongation, and at least one slit substantially parallel to said dimension of elongation;

a plurality of substantially parallel perforation lines formed in said web generally perpendicular to said dimension of elongation and with said at least one slit defining said web into individual labels; and each perforation line comprising alternating cuts and ties, said cuts comprising a plurality of first cuts having a first length, and at least one second cut having a second length at least twice as great as said first length and facilitating the start or end of ripping action of said web, without tearing of said web, along said perforation line, said at least one second cut intersecting said at least one slit, part of said second cut on each opposite side of said slit.

2. A web as recited in claim 1 wherein said at least one slit comprises a plurality of slits, each slit substantially bisected by a said second cut.

3. A web as recited in claim 2 wherein each second cut has a length at least four times as great as a first cut.

4. A web as recited in claim 1 wherein said web also includes first and second side edges substantially parallel to said dimension of elongation and said at least one slit, and wherein a second cut of each perforation line intersects each of said first and second side edges.

5. A web as recited in claim 4 wherein said at least one slit comprises a plurality of slits, each slit substantially bisected by a said second cut.

6. A web as recited in claim 5 wherein each second cut has a length at least four times as great as a first cut, and wherein at least one intermediate second cut is provided between said slits and side edges.

7. A web as recited in claim 1 where, in each second cut has a length at least four times as great as a first cut.

8. A web as recited in claim 5 wherein each second cut has a length of between about 0.125–0.25 inches, and wherein each first cut has a length of between about 0.012–0.018 inches.

9. A web as recited in claim 1 wherein each second cut has a length of between about 0.125–0.25 inches, said second cuts being spaced from each other a distance of between about 0.5–1.0 inches.

10. A web as recited in claim 1 wherein between 30–58 first cuts are provided per inch, each with a thickness of about 0.025–0.030 inches, and a length of between about 0.012–0.018 inches.

11. A method of producing linerless labels, using a paper web having first and second faces, comprising the steps of:

(a) feeding the web in a first direction;

(b) perforating the web at regularly spaced locations along the web in the first direction to form perforation lines, each perforation line extending substantially perpendicular to the first direction and comprising alternating cuts and ties, the cuts comprising a plurality of first cuts having a first length, and at least one second cut having a second length at least twice as great as the first length and facilitating the start or end of ripping action of the web, without tearing of the web, along the perforation line;

(c) applying a release coating to the first face of the web;

(d) applying a pressure sensitive adhesive layer to the second face of the web; and (e) forming at least one slit in the web, substantially parallel to the first direction, so that each of the at least one slits intersects a second cut of each perforation line, part of the second cut on each opposite side of the slit.

12. A method as recited in claim 11 wherein steps (b) and (e) are practiced to form a plurality of slits, each of the plurality of slits intersecting a second cut of each perforation line.

13. A method as recited in claim 12 wherein step (b) is practiced so that each second cut has a length at least four times greater than that of a first cut.

14. A method as recited in claim 12 wherein the web has first and second side edges substantially parallel to the first direction and the slits; and wherein step (b) is further practiced to provide second cuts intersecting the first and second side edges of the web.

15. A method as recited in claim 12 wherein steps (b)–(e) are practiced sequentially.

16. A method as recited in claim 12 wherein step (b) is practiced so that each second cut has a length of between about 0.125–0.25 inches, and each first cut has a length of between about 0.012–0.018 inches.

17. A method as recited in claim 12, wherein step (b) is practiced so that between 30–58 first cuts are provided per inch, each with a thickness of about 0.025–0.030 inches.

18. A method as recited in claim 11 comprising the further step (a1) of printing indicia on the web first face; and wherein steps (a1)–(e) are practiced sequentially.

19. A method as recited in claim 11 wherein step (b) is practiced so that each second cut has a length of between about 0.125–0.25 inches and are spaced from each other a distance of between about 0.5–1.0 inches.

20. A method as recited in claim 11 wherein step (b) is practiced so that between 30–58 first cuts are provided per inch, each with a thickness of about 0.025–0.030 inches.

* * * * *